United States Patent [19]
Patouillard

[11] 3,745,611
[45] July 17, 1973

[54] APPARATUS FOR SHIRRING ARTIFICIAL SAUSAGE CASING

[75] Inventor: Gilbert Patouillard, Beauvais, France

[73] Assignee: Societe Viscara, Paris, France

[22] Filed: Mar. 17, 1971

[21] Appl. No.: 125,056

[30] Foreign Application Priority Data
Mar. 25, 1970 France .......................... 7010669

[52] U.S. Cl. ............................ 17/42, 17/33, 53/197
[51] Int. Cl. ........................................... A22c 13/00
[58] Field of Search .................... 17/33, 34, 42, 35; 53/197

[56] References Cited
UNITED STATES PATENTS

| | | | |
|---|---|---|---|
| 3,112,517 | 12/1963 | Ives | 17/42 |
| 1,761,189 | 6/1930 | Brennan et al. | 17/42 |
| 3,412,523 | 11/1968 | Raymond et al. | 53/197 |
| 3,264,679 | 8/1966 | Moekle | 17/33 |

FOREIGN PATENTS OR APPLICATIONS
1,256,077  2/1960  France .................................. 17/42

*Primary Examiner*—Lucie H. Laudenslager
*Attorney*—Young & Thompson

[57] ABSTRACT

A method and apparatus for the preparation of shirred sausage casing. Unshirred sausage casing is threaded onto a vertical mandrel at a shirring station and then inflated. A vertically displaceable shirring head has a starting position adjacent to the lower end of the mandrel and moves upwardly during shirring and at least part of its weight being exerted against the shirred casing thereby effecting its pre-compression. The shirred, pre-compressed sausage casing is then severed from the adjacent unshirred portion of the casing whose end is at the same time flared. The shirred, pre-compressed casing still in position on the mandrel is then brought to a compression station where it is further compressed.

14 Claims, 8 Drawing Figures

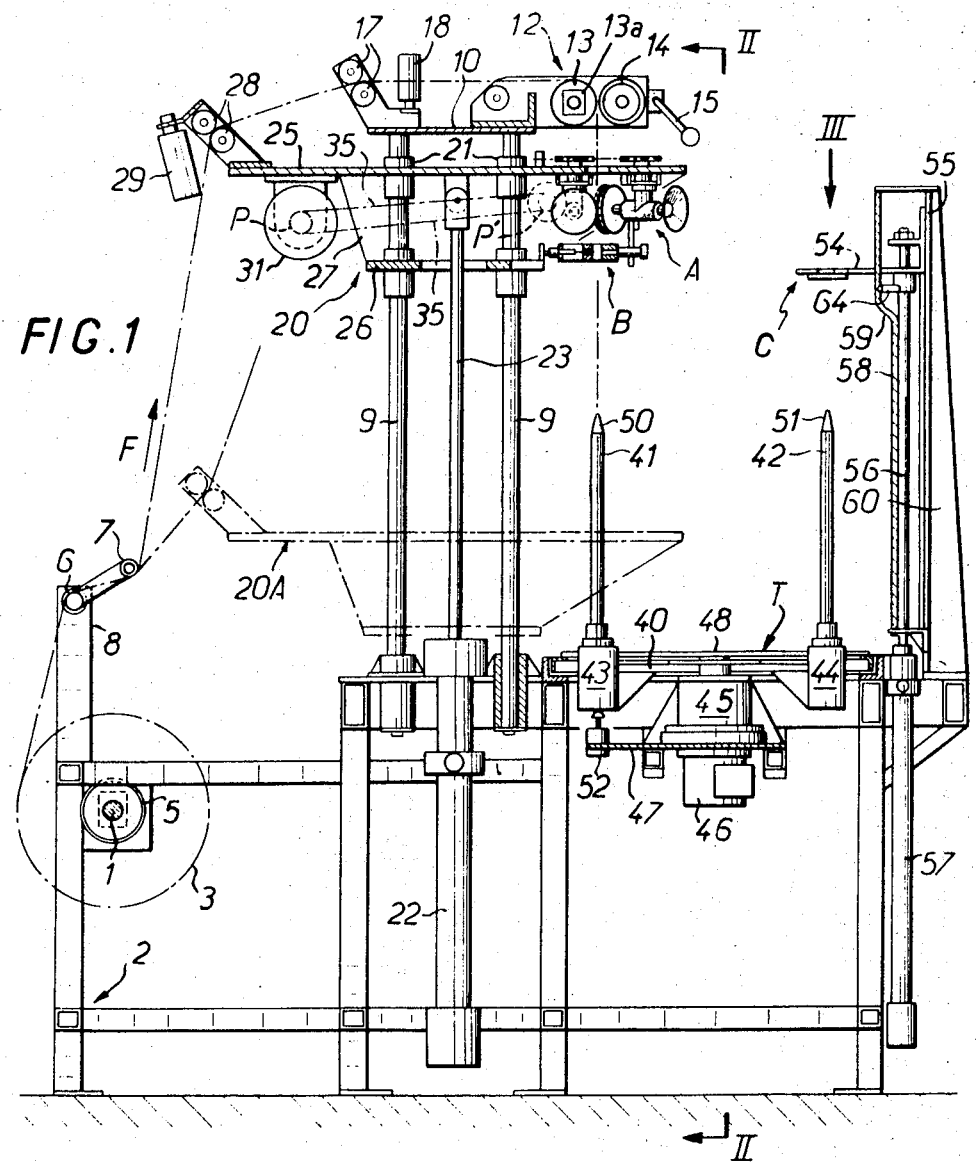
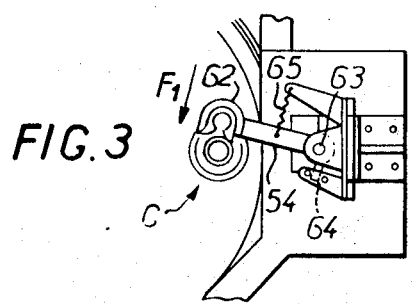

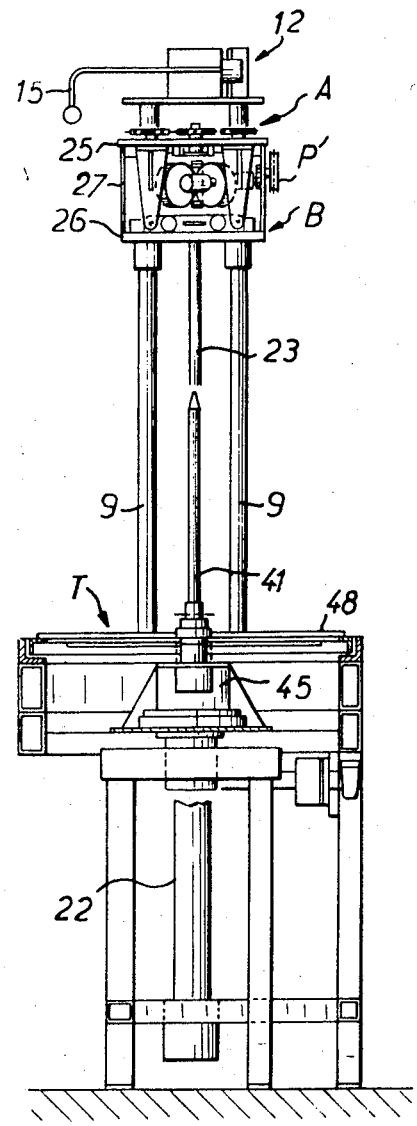
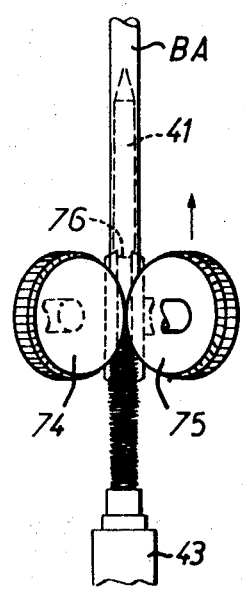

INVENTOR
GILBERT PATOUILLARD
By Young + Thompson
ATTYS.

APPARATUS FOR SHIRRING ARTIFICIAL SAUSAGE CASING

The present invention relates to a process and apparatus for shirring artificial sausage casing.

Such sausage casing used in the foodstuffs industry are in the form of thin-walled tubes of any desired length. These casings are prepared from synthetic or artificial material and may include a reinforcing agent, for example paper.

Sausage casings are manufactured in a very large range of sizes and for a large variety of foodstuffs, in particular in the production of sausages. In order to facilitate their use by reducing their length, such sausage casings are shirred or wrinkled, then longitudinally compressed and cut into portions, known as sticks, of any desired length.

Devices for shirring sausage casing are known. In general these devices comprise a fixed shirring head through which inflated casing is fed along a horizontal path by a feeding mechanism which adjusts the feed of the casing and its distribution at the shirring head. In the course of shirring the casing is supported on a horizontal mandrel which can either be stationary or floatingly mounted. After shirring, the casing is cut on the mandrel to the desired length and then compressed.

In a known device, the shirring and compression of the casing are effected on the same mandrel, the compression being effected by passing the shirred casing to another portion of the mandrel after opening a stop member which defines the portions of the mandrel.

According to another known device a plurality of mandrels are mounted on a turret and are brought into position one after another at a shirring head. The mandrel carrying the shirred casing is then brought by the rotation of the turret to a compression station while a mandrel free of casing is brought into position at the shirring head or station.

Such constructions require mechanisms having a great precision. Indeed, such devices require a perfect synchronization between the feeding of the casing and the operation of the shirring head calling for a complicated and sophisticated mechanism requiring constant and meticulous maintenance.

In single mandrel devices similarly complicated mechanisms are necessary to assure the perfect synchronization between the completion of the shirring and the passing to the compression station.

As for the cutting off of the casing on the mandrel, this is accomplished either by cutting and pulling which does not always assure a clean cut or by a knife moving through 360° about the entire periphery of the casing which requires a complex mechanism.

Another disadvantage of such devices is that they are very large in size and require their operators to constantly move about.

An aim of the present invention is to overcome the above mentioned disadvantages.

An aspect of the invention consists in a method for shirring sausage casings comprising shirring sausage casing on a mandrel while effecting a pre-compression of the shirred casing and subsequently effecting a further compression of the casing.

Another aspect of the invention consists in a method of preparing shirred sausage casings comprising shirring the sausage casing on a mandrel and simultaneously effecting a first-or pre-compression of the shirred casing at a shirring station, transferring the shirred casing to a compression station and effecting the further compression of the shirred pre-compressed casing at said compression station.

A further aspect of the invention consists in a method for shirring sausage casing comprising threading unshirred sausage casing onto a vertically orientated mandrel, inflating the casing and maintaining it inflated during shirring, moving a shirring head in position relative to the casing at the lower end of the mandrel, shirring the casing while applying a pre-compression thereto.

An even further aspect of the invention consists in an apparatus for shirring sausage casing comprising a hollow, vertical mandrel on which unshirred sausage casing is adapted to be threaded, means for supplying gas through the mandrel for inflating the unshirred casing, and shirring head means for shirring the casing and having a starting position adjacent to the lower end of the mandrel and constantly exerting at last part of its own weight on the shirred casing during shirring thereby effecting a pre-compression of the shirred casing, as it moves upwardly relative to the mandrel.

Preferably, and according to a more specific aspect of the invention, the casing wound on the reel leaves the reel and passes successively by tensioning means, roller guiding means in a feed unit including two drums one of which being provided with a metering device, the shirring head, a cutting device, after the operation of which the free end of the casing is pushed down onto the mandrel as the mandrel waits to be sent to the compression station.

According to a further feature of the present device, the movable shirring head mounted on the carriage moves upwardly relative to the mandrel during the shirring of the casing thereon while being supported on the portion of the casing which has already been shirred. This arrangement effects the so-called "pre-compression" of the casing which facilitates the subsequent compression which may in certain cases be dispensed with.

Further, the device according to the invention is less cumbersome and requires the operator to move about less frequently.

Finally, the cutting device for severing the shirred length of casing from the rest of the casing is automatic which produces a cut which is clean and efficient thereby avoiding any damage to the casing.

Further features and advantages of the present invention will be brought in the following description, made by way of example, of an embodiment with reference to the accompanying drawings, wherein:

FIG. 1 shows a schematic elevation view of the device according to the invention;

FIG. 2 shows a section taken along the line II—II of FIG. 1;

FIG. 3 shows a partial plan view of the device view from the direction of arrow III;

FIG. 6 shows an elevation view of a casing passing between the shirring rollers of the shirring head;

Figure 7:
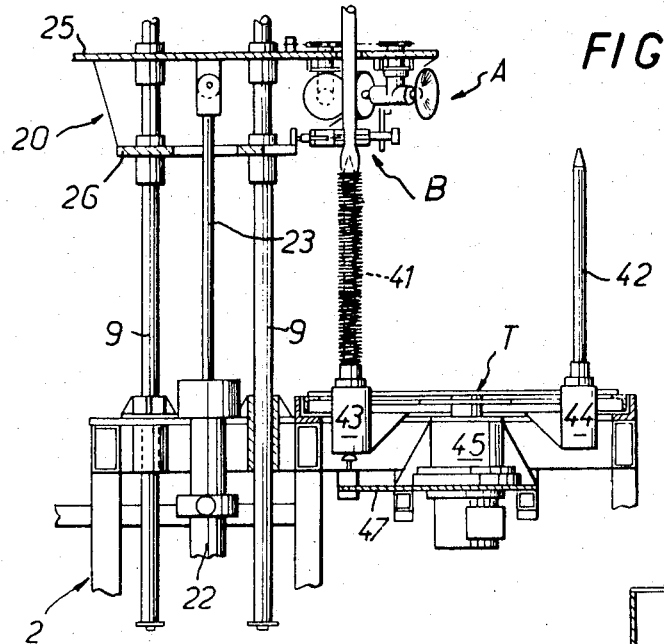
Figure 8:
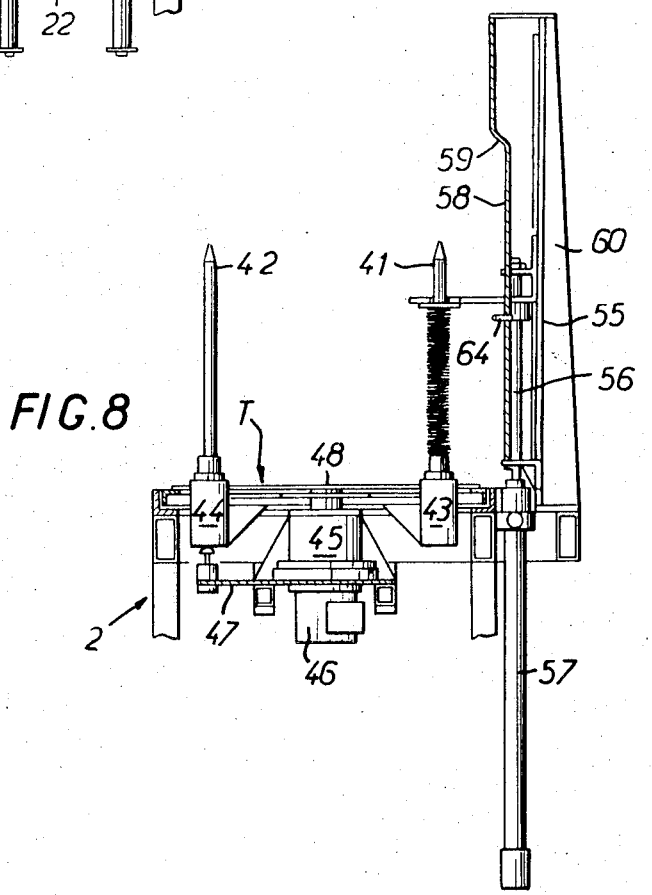

FIG. 7 schematically illustrates the severing of the shirred casing on the mandrel; and FIG. 8 schematically illustrates the compression of the shirred casing on a mandrel.

The illustrated embodiment of the device according to the present invention for shirring artificial sausage casing shows an unreeling spindle mounted on a frame 2 and adapted to receive a reel 3 of artificial sausage casing. The unreeling spindle 1 is provided with an electrically controlled brake 5. A tensioning device is disposed at the outlet end of the reel 3 and comprises a stationary roller 6 mounted on an upright member 8 of the frame 2 and a tensioning roller 7 freely pivotally mounted on the upright member 8.

The frame 2 supports four vertical columns 9 which in turn support a support plate 10 at their upper ends. The support plate 10 is adapted to receive a feeding unit indicated generally at 12 which comprises a drum 13 mounted for rotation, a pressure drum 14 formed of rubber and excentrically mounted, and a operating lever 15 cooperating with the pressure drum 14; the lever 15 is operable to move pressure drum away from the drum 13.

A metering device 13A with a presetting mechanism connected to the drum 13 counts the rotation thereof which thereby effectively measures the length of casing fed. Such a metering device is presettable for a predetermined length of casing.

A first pair of guide rollers 17 with horizontal axes and a second pair of guide rollers 18 with vertical axes are mounted for rotation on the support plate 10 upstream of the feeding device.

A carriage 20 comprises an upper support plate 25, a lower support plate 26 and bracing members 27 disposed therebetween. The carriage 20 is slidably mounted on vertical columns 9 by ball bearings 21. The displacement of the carriage 20 is effected by means of an adjustable pneumatic jack 22 having a ram 23 connected to the upper plate 25. The upper plate 25 carries a shirring head A known per se as well as a pair of guide rollers 28 with horizontal axes and a second pair of guide rollers 29 with vertical axes. A motor 31 with electric brake means is mounted on the lower surface of the upper plate 25. The motor 31 is arranged to counter-balance the weight of the shirring head A and is connected to the shirring head A by drive pulleys p-p' and an endless belt. The motor 31 is operatively connected to the metering device 13A with a presetting mechanism noted above. Automatic cutting devices B which will be described in detail below are connected to the lower plate 26.

The upper part of the frame 2 comprises a table T including a rotary plate 40 which supports two mandrels 41 and 42 diametrically opposite each other by the intermediary of shocking-absorbing devices such as blocks 43 and 44 of rubber. The centre of the plate 40 is supported on a hub 45 which is connected to pneumatic operating means 46 enabling the rotation of the table T through 180°. The pneumatic operating means 46 is supported on a support element 47 which is in turn supported on the frame 2. The plate 40 is covered by a protective plate 48. The pneumatic operating unit 46 is provided with a positioning means (not shown) for controlling the angular position of the table T. The mandrels 41 and 42 fixed to the table 40 comprise hollow tubes with a upwardly tapering conical portions at their free ends; the conical portions or tips 50, 51 are perforated at their apices. The support element 47 comprises inflating means comprising a pneumatic valve 52 which is positioned facing a shock-absorbing rubber block 43 so that it is in communication with the interior of the mandrel.

Reference will now be made to FIGS. 1-3 in which is shown the compressing unit C comprising an arm 54 which is vertically slidable on ball bearing 55 through the intermediary of the ram 56 of the pneumatic jack 57. A cam surface 58 for effecting a horizontal displacement of the arm 54 has an inflexion zone 59, the cam surface 58 is fixed to a support 60 which in turn is rigidly connected to the frame 2.

As shown in FIG. 3, the arm 54 has a U-shaped free end 62 and is pivotally mounted on a pivot 63, and its movement is determined by means of the follower 64 fixed to the arm 54 and maintained in contact with the cam surface 58 by the intermediary of a spring 65.

Figure 4:
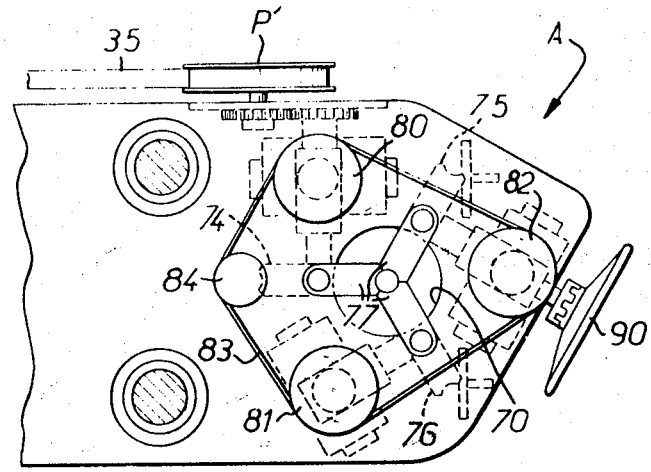
FIG. 4 shows a plan view of a shirring head indicated generally by A in FIG. 1.

Referring next to FIG. 4, the shirring head A is carried on the plate 25 having an opening 70 which enables the passage of the mandrel and which is situated in vertical alignment with the mandrel 41, for example, as illustrated in FIG. 1. The shirring head comprises shirring rolls 74, 75, 76 which are provided with lubricating brushes 77 connected to an oil reservoir (not shown).

The shirring rolls 74, 75, 76 are driven for rotation by means of pulleys 80, 81, 82 which are connected together by a belt 83 which is supported on an idler or tensioning pulley 84. The pulleys 80, 81, 82 are positively driven by the motor 31 through the intermediary of the cogged belt 35 in meshing engagement with the lateral pulley p' of the shirring head. A hard wheel 90 connected to the pulley 82 is adapted to enable manual rotation of the shirring rolls. The hand wheel 90 is automatically disconnected during the positive driving of the pulleys.

Figure 5:
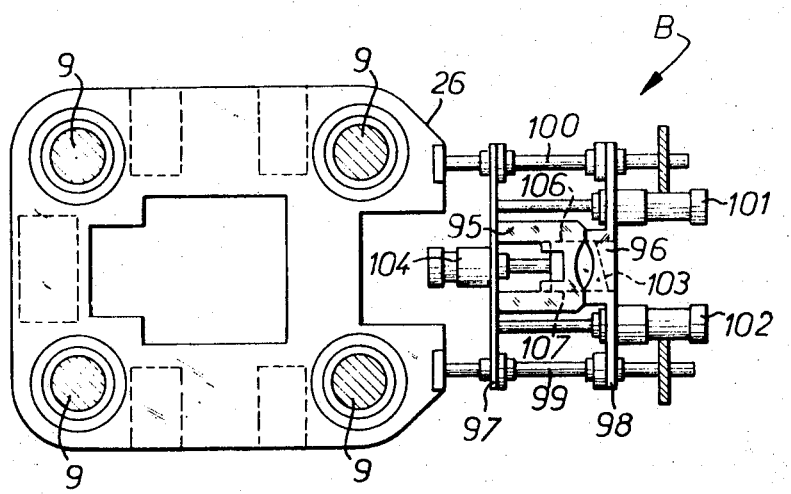
FIG. 5 shows a plan view of the cutting device for severing the casing indicated generally by B in FIG. 1.

Reference will now be made to FIG. 5 illustrating the automatic severing or cutting device B. The automatic severing or cutting device is fixed at the end of the plate 26 substantially in line with a mandrel and comprises suction jaws 95, 96 which are mounted on crossmembers 97, 98 slidably mounted on bars 99, 100 fixed to the plate 26, the suction jaws being displaceable by means of jacks 101, 102. A cutter 103 is slidably mounted on guides 106-107 formed in suction jaws 95, 96.

The operation of the device according to the invention is as follows:

The sausage casing BA is unreeled manually from the reel 3 and passes over the roller 6 and the tensioning roller 7 following the path indicated by chain-dotted lines in FIG. 1. After the leaving the roller 7 the casing is guided between rollers 29, 28, 17 and 18 and then passes through the feeding unit 12 between the drums 13 and 14. At the outlet end of the rollers the casing follows a vertical path downwards through the opening 70 of the plate 25, then between the shirring rolls 74, 75, 76 and finally between the jaws 95, 96 in open position of the severing or cutting device. The casing is then pulled vertically downwards and is threaded onto the mandrel in position (the mandrel 41 in the illustrated position) until the end of the casing reaches the lower end of the mandrel.

At the beginning of the operating cycle the carriage 20 is in its uppermost position. The downward movement of the carriage 20 is controlled by the operation of the pneumatic jack 22 which is arranged to effect the opening of the pneumatic valve 52 which directs air into the mandrel 42, the air passing through the perforated tip 50 in the mandrel inflates the casing to a low pressure. The casing is maintained in its inflated condition throughout the shirring operation.

For a given position of the jack 22 the carriage 20 is at the end of its path of downward movement (dotted lines in FIG. 1). The shirring rolls 74, 75, 76 are then in position in contact with the casing at the bottom of the mandrel 41. The stopping of the carriage at the given position of the jack effects the starting of the motor 31 which in turn effects the rotation of the shirring rolls 74, 75, 76. During the rotation (see FIG. 6 in particular) the rolls grip the inflated casing, shirr it while pulling it downwards thereby tending to unwind casing on the reel 3. The movement of the casing is controlled by the electric brake 5 mounted on the spindle 1. The casing shirred downstream of the shirring rolls 74–76 applies a vertical acting force which tends to urge the shirring head upwards. An equilibrium is effected between the force exerted by the adjustable jack 22 acting upwardly on the carriage 20 and the force exerted by the weight of the carriage including the shirring head on the shirred casing. Further, the weight of the shirring head resting on the shirred casing effects a pre-compression of the casing. During the shirring operation, the casing is lubricated by the brushes 77, the feeding of the oil being controlled continuously by the shirring rolls 74–76.

By means of the metering device 13A with pre-setting mechanism mounted on the rotatable drum 13, the motor 31 is stopped when the desired length of casing has passed through the drums 14 and 15. The stopping of the motor 31 in turn causes the stopping of the shirring rolls 74–76. However, the carriage continues its movement for several additional contimetres until the jack 22 reaches a position which triggers the stopping of the carriage 20. The shirring head A is at this moment (FIG. 7) out of contact with the mandrel and the severing or cutting device B is, therefore, positioned in alignment with the mandrel 41 and just above the top end of the shirred casing. The stopping of the carriage 20 effects the operation of the jacks 101, 102 acting on the cross members 97, 98, which casues the jaws 95, 96 to come together squeezing the casing. The stopping of the cross members 97 and 98 causes the starting of the jack 104 which operates the cutter 103. The cutter 103 severs the casing held in the jaws 95 and 96 which are connected to the cross members 97 and 98. The cutter 103 guided in guides 106–107 assures the complete, clean severing of the casing held in the jaws. After severing the casing, the withdrawal of the cutter 103 causes the separation of the jaws. The inner surfaces of the jaws 95 and 96 upon their separation effect a suction on the wall of the casing thereby bringing about the flaring of the end of the casing. The casing end thus flared can be easily be brought again into position on the shirring mandrel to begin a new operating cycle.

The end of the path of movement of the carriage 20 which corresponds to the uppermost position of the jack 22 triggers the operation of the pneumatic operating unit 46 which in turn effects the turning of the table T through 180°. The mandrel 42 devoid of casing takes the place of the mandrel 41 whereas the mandrel 41 carrying the shirred casing takes the place of the mandrel 42 at the compressing station in position relative to the compressing arm 54 in its raised position. By operation of the pneumatic jack 22 controls the lowering of the carriage 20 the pneumatic jack 56 controlling the compressing arm 54. By the operation of the pneumatic jack 57 the arm 54 is moved vertically downwards sliding along ball bearing 55.

During the downward movement (see FIGS. 3 and 8) the follower 64 fixed to the arm 54 is maintained by the spring 65 in contact with the cam surface. The follower thus passes the inflexion zone 59 bringing about a rotary movement of the arm about the pivot 63 in the direction $F_1$. By this movement the U-shaped portion 62 at the end of the arm 54 is driven into position in line with the mandrel 41 carrying the shirred casing. The lowering of the arm 54 continues, the U-shaped portion 62 arrives at the level of the free end of the mandrel carrying the shirred casing, passes over the end of the mandrel and acts against the shirred casing. The downward movement of the arm 54 effects the compression of the shirred casing. Once it has arrived at the end of its path of movement, the arm 54 remains in this position for a certain period of time in order to maintain the shirred casing under pressure and to complete the compression of the casing. Then the arm 54 begins its upward length along the elngth of the mandrel sliding on the ball bearing 55 and guided by the follower 64 along the length of the cam surface 50.

At the inflexion zone 59 the follower 64 effects the rotation of the arm 54 in the direction opposite to that described above in order to retract the arm which in returning to its starting position frees the zone disposed above the mandrel at 41 in order to permit the easy removal of the compressed casing from the mandrel. The compressed casing is removed manually from the mandrel once the arm has reached its rest position.

The present embodiment is not intended to be in any way limiting relative to the scope of the invention but on the contrary covers all variations and equivalents. In particular the shirring rolls can be replaced by any other shirring means.

What I claim is:

1. An apparatus for shirring sausage casing comprising a hollow, vertical mandrel on which unshirred sausage casing is adapted to be threaded, means for supplying gas through the mandrel for inflating the unshirred casing, and shirring head means for shirring the casing and having a starting position adjacent to the lower end of the mandrel and constantly exerting at least part of its own weight on the shirred casing during shirring thereby effecting a pre-compression of the shirred casing, as it moves upwardly relative to the mandrel.

2. An apparatus according to claim 1, wherein a metering device with pre-setting mechanism is provided for measuring and indicating a predetermined length of casing fed onto the mandrel.

3. An apparatus according to claim 1, wherein the shirring head means comprises a plurality of rotating wheels spaced from a common axis adapted to coincide with that of the mandrel and each having the same direction of rotation.

4. An apparatus according to claim 1 further comprising compression means at a compression station in which the precompressed is further compressed, and a movable table, two said mandrels being provided each being mounted on said movable table, such that while one mandrel is in position relative to a shirring station where the shirring head means is, the other is adjacent said compression station.

5. An apparatus according to claim 4, further comprising a carriage adapted to be vertically displaced relative to the mandrel at the shirring station, the shirring head means being supported on said carriage and wherein said carriage also supports a cutting device for severing the shirred portion of the casing from the unshirred portion thereof.

6. An apparatus according to claim 5, further comprising a reel and a feeding unit for feeding unshirred casing from said reel to the mandrel at the shirring station arranged upstream of said mandrel.

7. An apparatus according to claim 6, further comprising means compensating for irregularities in the unreeling of the unshirred casing including an electrically operated brake for the reel, and tensioning means for the unshirred casing passing from the reel to the feeding unit.

8. An apparatus according to claim 5, further comprising a jack exerting a force on the carriage opposed to and less than the force exerted by the weight of the carriage on the shirred casing.

9. An apparatus according to claim 5, wherein the cutting device comprises two gripping jaws and a cutter adapted to cut the casing perpendicular to its axis.

10. An apparatus according to claim 9, wherein the cutting device is arranged to sever the casing at a point adjacent to the uppermost shirred portion.

11. An apparatus according to claim 10, wherein the cutting device is arranged for sliding movement in a plane midway between the jaws of the cutting device.

12. An apparatus according to claim 11, wherein the jaws include means for flaring the end of the casing gripped therein for facilitating the rethreading of the unshirred casing onto a free mandrel at the shirring station.

13. An apparatus according to claim 4, wherein said compression means comprises a movable compression arm displaceable between a raised rest position and a lowered compression position in which it exerts a compression force on the shirred, precompressed casing to further reduce its length.

14. An apparatus according to claim 13, wherein the compression arm is retractable from a position in line with the mandrel to a discharging position displaced therefrom.

* * * * *

UNITED STATES PATENT OFFICE
CERTIFICATE OF CORRECTION

Patent No. 3,745,611            Dated July 17, 1973

Inventor(s)    Gilbert Patouillard

It is certified that error appears in the above-identified patent and that said Letters Patent are hereby corrected as shown below:

On the cover sheet [73] "Assignee: Societe Viscara" should read -- Societe Viscora --.

Signed and sealed this 27th day of August 1974.

(SEAL)
Attest:

McCOY M. GIBSON, JR.           C. MARSHALL DANN
Attesting Officer              Commissioner of Patents